United States Patent [19]

Sugino et al.

[11] Patent Number: 4,983,451
[45] Date of Patent: Jan. 8, 1991

[54] CARBON FIBER-REINFORCED CARBON COMPOSITE MATERIAL AND PROCESS FOR PRODUCING THE SAME

[75] Inventors: Morihiko Sugino; Yoshio Inoue, both of Hyogo, Japan

[73] Assignee: Kabushiki Kaisha Kobe Seiko Sho, Kobe, Japan

[21] Appl. No.: 177,082

[22] Filed: Apr. 4, 1988

[30] Foreign Application Priority Data

Aug. 5, 1987 [JP] Japan .................................. 62-195741

[51] Int. Cl.$^5$ ............................................. B32B 5/16
[52] U.S. Cl. ...................................... 422/283; 156/148; 423/447.1; 423/447.2; 428/284; 428/367; 428/402; 428/408; 428/300
[58] Field of Search ................ 428/283, 284, 300, 408, 428/367, 402; 156/148; 423/447.1, 447.2

[56] References Cited

U.S. PATENT DOCUMENTS 3,994,762 11/1976 Wrzesien et al. .
4,201,611 5/1980 Stover ................................. 428/113
4,370,390 1/1983 Burk ................................... 428/408
4,515,847 5/1985 Taverna et al. ..................... 428/408

FOREIGN PATENT DOCUMENTS 1272854 10/1989 Japan .................................. 428/300
2012671 8/1979 United Kingdom .
2099365 12/1982 United Kingdom .
2175930 12/1986 United Kingdom ................ 428/300

Primary Examiner—James J. Bell
Attorney, Agent, or Firm—Oblon, Spivak, McClelland, Maier & Neustadt

[57] ABSTRACT

Disclosed herein are a carbon fiber-reinforced carbon composite material composed of carbon as a matrix and carbon fiber as a reinforcement, and also a process for producing the same. The composite material is produced by coating nonwoven fabrics of carbon fiber or a blend of carbon fiber and organic fiber with a filler-containing liquid, laminating the nonwoven fabrics one over another, and subjecting the laminated nonwoven fabrics to needle punching repeatedly with a plurality of needles, thereby yielding a prepreg of three-dimensional structure, and carbonizing and calcining the thus obtained prepreg.

10 Claims, 1 Drawing Sheet

CARBON FIBER-REINFORCED CARBON COMPOSITE MATERIAL AND PROCESS FOR PRODUCING THE SAME

BACKGROUND OF THE INVENTION

1. Field of the Invention

The present invention relates to a carbon fiber-reinforced carbon composite material composed of carbon as a matrix and carbon fiber as a reinforcement, and also to a process for producing the same.

2. Description of the Prior Art

Carbon fiber-reinforced carbon composite material is referred to as C/C material. It is used as a heat-resistant material in the fields of spacecraft and aircraft. The process for producing the C/C composite material is disclosed in U.S. Pat. Nos. 3,734,797 and 4,201,611; British Patent No. 1,360,887; Japanese Patent Laid-open Publication Nos. 62768/1974 and 101985/1979; and Japanese Patent Publication No. 25094/1987. According to one of the disclosed processes, the C/C composite material is produced in the following manner. At first, a preform of nonwoven fabric or woven fabric is impregnated or coated with pitch or a thermosetting resin such as phenolic resin, furan resin, and epoxy resin, thereby to form a prepreg. A plurality of the prepregs are laminated on top of the other to form a multi-layer product. The layers are made into a unified body by press molding or the like. The unified body is calcined so that the matrix resin is carbonized and graphitized. If necessary, the impregnation and calcination are repeated to increase the density of the composite material. According to the other disclosed process, the C/C composite material is produced by the steps of laminating nonwoven fabrics by needle punching, thereby forming a preform, impregnating the preform with a resin, and calcining and carbonizing the impregnated preform.

The above-mentioned process has a disadvantage that the pitch or thermosetting resin does not permeate into the filament yarns (composed of 1000 to 4000 filaments) which constitute the nonwoven fabric or woven fabric. Thus the resulting C/C composite material is liable to cracking at the fiber-matrix interface and also to delamination. Moreover, the C/C composite material produced by the above-mentioned process has locally unbalanced strength which leads to delamination and deformation during use.

In order to overcome these disadvantages, a new C/C composite material has been developed. It is produced by mixing a matrix raw material (such as thermosetting resin) with short fiber to give a prepreg, and molding and calcining the prepreg. The thus produced short fiber-reinforced carbon composite material is poor in strength and impact resistance because the fiber region is small and the fiber-to-fiber distance is large. An additional disadvantage of this composite material is that the strength in the direction parallel to the surface is smaller than in the direction perpendicular to the surface.

SUMMARY OF THE INVENTION

The present invention was completed to overcome the above-mentioned disadvantages. Accordingly, it is an object of the present invention to provide a carbon fiber-reinforced carbon composite material which has an increased strength in the direction parallel to the surface of the laminated nonwoven fabric and also meets the requirements for large-sized complex-shaped products. It is another object of the present invention to provide a process for producing the carbon fiber-reinforced carbon composite material.

DETAILED DESCRIPTION OF THE INVENTION

Figure 1:
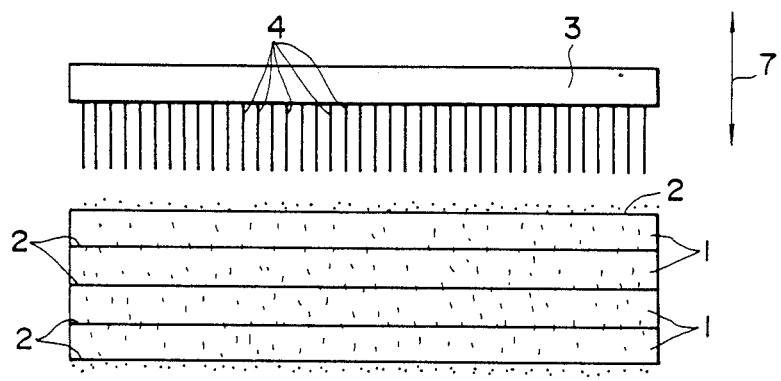
FIG. 1 is a schematic diagram illustrating the process used in an example of the invention.

The carbon fiber-reinforced carbon composite material pertaining to the present invention is produced by coating nonwoven fabrics of carbon fiber or a blend of carbon fiber and organic fiber with a filler-containing liquid, laminating the nonwoven fabrics one over another, and subjecting the laminated nonwoven fabrics to needle punching repeatedly with a plurality of needles, thereby yielding a prepreg of three-dimensional structure, said filler-containing liquid being composed of a base liquid of synthetic resin liquid and one or more than one kind of filler selected from graphite powder, carbon black powder, carbon short fiber, graphite short fiber, synthetic resin powder, pitch powder, mesophase pitch powder, coke powder, ceramics powder, metal powder, metal short fiber, $Si_3N_4$ whisker, SiC whisker, and ceramics short fibers.

According to the process of the invention, nonwoven fabrics containing carbon fiber which are placed one over the other undergo needle punching, with the filler-containing liquid interposed between them. The needle punching forces the liquid into the nonwoven fabric in the thickness direction, with the result that the filler applied to and supported on fibers is sufficiently distributed in the thickness direction. Moreover, the needle punching causes carbon fibers and filler to orient in the thickness direction at the interface between the nonwoven fabrics placed one over the other. The oriented carbon fibers and filler greatly increase the resistance to delamination. Incidentally, needle punching can be applied to any large-sized or complex-shaped carbon fiber-reinforced composite material to impart uniform strength and performance by properly arranging the number and distribution of needles.

The present invention was completed on the basis of findings obtained in the present inventors' experiments carried out to achieve the object of the present invention. In the first experiment, nonwoven fabrics placed on top of the other was subjected to needle punching to prepare a nonwoven fabric of such structure that fibers run in the thickness direction and holes are made in the direction perpendicular to the interlayer. The needle-punched nonwoven fabric was then impregnated with a liquid containing a filler such as carbon powder, $Si_3N_4$, and SiC whisker, followed by calcination. The steps of impregnation and calcination were repeated. It was found that the powdery filler suspended in the liquid does not permeate the nonwoven fabric but stays on the surface of the nonwoven fabric. It was also found that it is difficult to obtain a high-density product because the nonwoven fabric containing a large amount of carbon fibers is limited in basis weight on account of resistance to needle punching. Nonwoven fabrics of low basis weight easily deform during impregnation and calcination, giving no products of desired dimensions. In the second experiment conducted to overcome these disadvantages, nonwoven fabrics were subjected to needle punching after they were coated with a filler-containing liquid. It was found that the needle punching forces the filler into the nonwoven fabric and distributes it at a sufficiently high density in the thickness direction.

An embodiment of the present invention will be explained with reference to the accompanying drawing. FIG. 1 is a schematic representation illustrating the method pertaining to the present invention. In FIG. 1, there is shown a nonwoven fabric 1 which is composed of carbon fibers or a blend of carbon fibers and organic fibers. According to the process of the present invention, the surface of the nonwoven fabric 1 is coated with a filler-containing liquid 2, and the coated nonwoven fabrics (four sheets in the illustrated embodiment) are laminated one over another. The filler-containing liquid is composed of a base liquid of synthetic resin and a filler dispersed therein. The filler is carbon, metal, ceramics, synthetic resin, or a blend thereof in the form of powder, whisker, or short fiber which serves as a reinforcement for the carbonaceous matrix. Examples of the filler include graphite powder, carbon black powder, carbon short fiber, phenolic resin powder, epoxy resin powder, pitch powder, mesophase pitch powder, coke powder, metal powder and short fiber (e.g., stainless steel, nickel, steel, aluminum, brass, and cast iron), $Si_3N_4$ whisker, SiC whisker, and ceramics short fibers. They are used alone or in combination with one another. The nonwoven fabric 1 should preferably have a basis weight of 5 g/m$^2$ or above. With a basis weight lower than 5 g/m$^2$, the nonwoven fabric is too loose to be coated satisfactorily.

The filler-containing liquid 2 may be in the form of paste as well as liquid. Its coating weight is 0.5 to 300 times the weight of the nonwoven fabric. With a coating weight less than 0.5 times, the effect of the filler is not satisfactory. With a coating weight in excess of 300 times, the filler spoils the performance of the nonwoven fabric.

Figure 2:
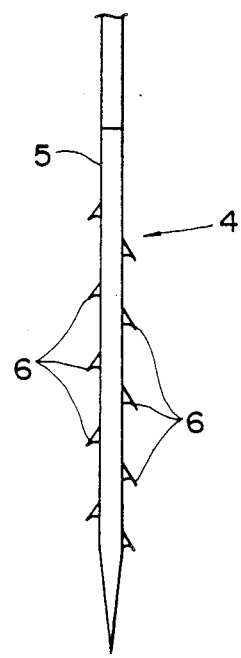
FIG. 2 is a schematic diagram illustrating the structure of the needle.

Needles 4 are set in a flat support 3. As shown in FIG. 2, each needle 4 has a shank 5 and barbs 6 projecting outward from the shank 5. The needles 4 should preferably be set at a density of 5 needles/cm$^2$ or above. Otherwise, the needles do not catch as many carbon fibers as necessary for the sufficient distribution of the filler in the thickness direction.

Needle punching is accomplished by reciprocatively moving the needles 4 vertically with respect to the surface of the nonwoven fabric 1 (in the direction shown by the arrow 7) so that the needles 4 are forced into the laminated nonwoven fabrics 1 repeatedly. Needle punching causes carbon fibers to be arranged vertically with respect to the surface of the nonwoven fabric. Needle punching also forces the filler into the nonwoven fabric 1 because each layer of the nonwoven fabrics 1 is coated with the filler-containing liquid 2. After needle punching, the filler is oriented in the thickness direction of the nonwoven fabrics 1 and a portion of the filler is present across the interface of the nonwoven fabrics as schematically shown in FIG. 1.

The needles should preferably be pushed in the direction perpendicular to the surface of the nonwoven fabric; however, the pushing direction may be inclined within 45 degrees without any adverse effect on the object of the present invention. If the needles are inclined more than 45 degrees, the desired effect of needle punching is not produced because the pushed needles tend to slip along the surface of the nonwoven fabric.

After a series of needle punching, a plurality (say, 4 sheets) of additional nonwoven fabrics 1 which have been coated with the filler-containing liquid are placed on the punched nonwoven fabrics 1, and needle punching is repeated so that carbon fibers and filler are distributed in the thickness direction of the nonwoven fabrics 1. In this way there is obtained a prepreg of three dimensional structure in which a prescribed number of nonwoven fabrics 1 are integrally laminated.

Subsequently, this prepreg is densified by the application of isostatic pressure of 500 kgf/cm$^2$ or above. With a pressure lower than 500 kgf/cm$^2$, the resulting product will not have satisfactory performance because the filler is not uniformly distributed.

Finally, the prepreg is dried and then cured at a proper temperature (say, 150° C.). After curing, the prepreg is carbonized and calcined in a furnace at a proper temperature (say, 1000° C.).

The thus obtained C/C composite material has the matrix of carbonaceous material formed by the carbonization and calcination of the synthetic resin constituting the base of the filler-containing liquid. If the synthetic resin is a thermosetting resin such as phenolic resin and epoxy resin, it forms vitreous carbon after carbonization and calcination. If the base contains graphite (soft carbon) or pitch and/or coke which becomes soft carbon upon calcination, there is obtained a matrix composed of vitreous carbon and soft carbon.

EXAMPLE 1

A nonwoven fabric having a basis weight of 200 g/m$^2$ was prepared from carbon fiber tow (having a tensile strength of 300 kg/mm$^2$) and polyester fiber by carding in a ratio of 80:20 by weight. The nonwoven fabric was cut to a size of 100 mm wide by 200 mm long. As many nonwoven fabrics as necessary were coated with a filler-containing liquid (in a paste form) of the formulation shown in Table 1.

TABLE 1

| Filler containing liquid | Filler | | Base liquid |
|---|---|---|---|
| | Graphite powder (wt %) | Phenolic resin powder (wt %) | Phenolic resin (wt %) |
| No. 1 | — | 50 | 50 |
| No. 2 | 30 | 20 | 50 |
| No. 3 | 50 | — | 50 |
| No. 4 | — | — | 100 |

The paste-coated nonwoven fabrics were laminated on top of the other. Each time of lamination, the nonwoven fabrics underwent needle punching at a density of 10 needles/cm$^2$. Twenty layers of nonwoven fabrics were laminated. The thus obtained prepreg was heated for curing at 150° C. for 40 minutes, followed by calcination in a furnace at 1000° C. for 5 hours. Thus there was obtained a C/C composite material having a specific gravity of 1.5 g/cm$^3$ and a porosity of 10%. The physical properties of the thus obtained C/C composite materials are shown in Table 2.

TABLE 2

| Filler-containing liquid | Density (g/cm$^3$) | Flexural strength (kgf/cm$^2$) | Compressive strength (kgf/cm$^2$) | |
|---|---|---|---|---|
| | | | Thickness direction | Parallel to the surface |
| No. 1 | 1.40 | 1000 | 1530 | 1200 |
| No. 2 | 1.48 | 1000 | 1400 | 1000 |

TABLE 2-continued

| Filler-containing liquid | Density (g/cm³) | Flexural strength (kgf/cm²) | Compressive strength (kgf/cm²) | |
|---|---|---|---|---|
| | | | Thickness direction | Parallel to the surface |
| No. 3 | 1.50 | 900 | 1200 | 800 |
| No. 4 | 1.35 | 600 | 700 | 400 |

It is noted from Table 2 that the C/C composite materials obtained from nonwoven fabrics coated with the filler-containing liquid Nos. 1, 2, and 3 pertaining to the present invention have a high density, a high flexural strength, and a high compressive strength (specially in the direction along the interface of the laminated layers). When it comes to sliding performance, the filler-containing liquid No. 3 is the best and No. 2 comes next, according to the braking test conforming to SAE J661. The thus obtained C/C composite material was not subject to delamination, swelling, and cracking.

EXAMPLE 2

A nonwoven fabric was prepared from carbon fiber and polyvinyl chloride fiber at a blending ratio of 90:10 by weight. The nonwoven fabric was cut to size as in Example 1. Twenty layers of nonwoven fabrics were laminated by repeating the application of the filler-containing liquid (Nos. 1 to 3 shown in Example 1) and the needle punching at a density of 10 needles/cm². As many nonwoven fabrics as necessary were coated with a filler-containing liquid (in a paste form) of the formulation shown in Table 1. Curing and calcination were carried out under the same conditions as in Example 1. The physical properties of the thus obtained C/C composite materials are shown in Table 3.

TABLE 3

| Filler-containing liquid | Density (g/cm³) | Flexural strength (kgf/cm²) | Compressive strength (kgf/cm²) | |
|---|---|---|---|---|
| | | | Thickness direction | Parallel to the surface |
| No. 1 | 1.42 | 1200 | 1550 | 1250 |
| No. 2 | 1.49 | 1000 | 1450 | 1100 |
| No. 3 | 1.51 | 950 | 1300 | 900 |

In this example, there were obtained high-density, high-strength C/C composite materials which are not subject to delamination, swelling, and cracking.

EXAMPLE 3

A nonwoven fabric having a basis weight of 100 g/m² was prepared from carbon fiber and polyvinyl chloride fiber at a blending ratio of 90:10 by weight. The nonwoven fabric was cut to a size of 100 mm by 100 mm. Twenty layers of the nonwoven fabrics were laminated by repeating needle punching at a density of 5 needles/cm² or above, with each layer coated with a filler-containing liquid in the form of paste prepared by dissolving 100 g of phenolic resin powder in 100 g of furfuryl alcohol and incorporating the resulting solution with 50 g of graphite powder and 10 g of CF milled. Needle punching was repeated for several layers at one time. After the completion of needle punching, the upper and lower surfaces of the laminate were coated with paste. The needle-punched laminate underwent cold isotactic pressing at 2000 kgf/cm², followed by drying at 100° C. or below for 3 days. The dried laminate underwent press molding at 180° C. and 50 kgf/cm². The resulting molded product was calcined in a nonoxidative atmosphere by raising the temperature at a rate of 10° C./hour or below until 500° C. and at a rate of 30° C./hour or below until 1000° C. Thus there was obtained a C/C composite material. The same experiment as above was repeated except that the formulation of the paste was changed as shown in Table 4. The characteristic properties of the thus obtained C/C composite materials are shown in Table 5.

TABLE 4

| No. | Phenolic resin powder | Graphite powder | Third components | | | | |
|---|---|---|---|---|---|---|---|
| | | | CF milled | SiC whisker | Wollastonite powder | Kaolin | Stainless steel fiber |
| 1 | 100 | 50 | 10 | — | — | — | — |
| 2 | 100 | 50 | — | 10 | — | — | — |
| 3 | 100 | 50 | — | — | 10 | — | — |
| 4 | 100 | 50 | — | — | — | 10 | — |
| 5 | 100 | 50 | — | — | — | — | 10 |
| 6 | 100 | 50 | — | — | — | — | 20 |
| 7 | 100 | 50 | — | — | — | — | 30 |

Unit: parts by weight

TABLE 5

| Paste No. | Density (g/cm³) | Flexural strength (kgf/cm²) | Compressive strength (kgf/cm²) | |
|---|---|---|---|---|
| | | | Thickness direction | Parallel to the surface |
| 1 | 1.58 | 1050 | 1600 | 1100 |
| 2 | 1.55 | 950 | 1680 | 1050 |
| 3 | 1.63 | 750 | 1500 | 800 |
| 4 | 1.65 | 700 | 1450 | 800 |
| 5 | 1.70 | 1150 | 1650 | 1050 |
| 6 | 1.72 | 1100 | 1600 | 950 |
| 7 | 1.75 | 1000 | 1500 | 900 |

COMPARATIVE EXAMPLE

The same procedure as in Example 2 was repeated except that needle punching was not performed. The characteristic properties of the resulting C/C composite materials are shown in Table 6. It is noted that all the products are inferior to those in Examples 1 and 2. The product formed by applying the filler-containing liquid No. 1 delaminated and cracked during use, and the products formed by applying the filler-containing liquid Nos. 2 and 3 delaminated and cracked during the production process.

TABLE 6

| Paste No. | Density (g/cm³) | Flexural strength (kgf/cm²) | Compressive strength (kgf/cm²) | |
|---|---|---|---|---|
| | | | Thickness direction | Parallel to the surface |
| 1 | 1.30 | 650 | 950 | 400 |
| 2 | 1.38 | 550 | 900 | 400 |

TABLE 6-continued

| Paste No. | Density (g/cm³) | Flexural strength (kgf/cm²) | Compressive strength (kgf/cm²) | |
|---|---|---|---|---|
| | | | Thickness direction | Parallel to the surface |
| 3 | 1.41 | 500 | 700 | 350 |

As mentioned above, the carbon fiber-reinforced composite material of the present invention has an extremely high strength in the direction along the surface because the filler in the form of powder, fiber, or whisker is added in the thickness direction in the layers and interfaces of nonwoven fabrics. The filler also contributes to the improvement of sliding performance of the composite material. Owing to the needle punching which unifies the laminated nonwoven fabrics, the composite material contains uniformly distributed reinforcement in the matrix. Thus, according to the method of the present invention, it is possible to produce easily a large-sized complex-shaped composite material.

What is claimed is:

1. A process for producing a carbon fiber-reinforced carbon composite material, which comprises layering non-woven fabrics of carbon fiber or a blend of carbon fiber and organic fiber, which have been coated with a filler containing liquid, to obtain a layered material; and
    needle punching said layered material with a plurality of needles, to obtain a prepreg of three-dimensional structure;
    wherein said filler-containing liquid comprises a synthetic resin liquid and at least one filler selected from the group consisting of graphite powder, carbon black powder, carbon short fiber, graphite short fiber, synthetic resin powder, pitch powder, mesophase pitch powder, coke powder, ceramic powder, metal powder, metal short fiber, $Si_3N_4$ whiskers, SiC whiskers, and ceramic short fibers.

2. A process for producing a carbon fiber-reinforced carbon composite material as claimed in claim 1, wherein the prepreg is carbonized and calcined by at least one process of pressing, drying, heat curing, polymerization, carbonization, and infusibilization.

3. A process for producing a carbon fiber-reinforced carbon composite material as claimed in claim 1, wherein the needle punching is performed at a density of 5 needles/cm² or above.

4. A process for producing a carbon fiber-reinforced carbon composite material as claimed in claim 1, wherein the nonwoven fabric has a basis weight of 5 g/m² and above, the filler-containing liquid is in the form of paste or liquid, and the filler-containing liquid is used in an amount of 0.5 to 300 times the weight of the nonwoven fabric.

5. A process for producing a carbon fiber-reinforced carbon composite material as claimed in claim 2, wherein the pressing process is performed by isotactically pressing a plurality of prepregs at a pressure of 500 kgf/cms² or above.

6. A process for producing a carbon fiber-reinforced carbon composite material as claimed in claim 2, wherein the calcination is accomplished such that the carbon fibers are surrounded by vitreous carbon and the remaining space is filled with soft carbon.

7. A process for producing a carbon fiber-reinforced carbon composite material as claimed in claim 1, wherein the nonwoven fabric contains carbon fiber in an amount of 1 to 99 times the weight of organic fiber.

8. A carbon fiber-reinforced carbon composite material produced by the process, which comprises layering non-woven fabrics of carbon fiber or a blend of carbon fiber and organic fiber, which have been coated with a filler containing liquid, to obtain a layered material;
    needle punching said layered material with a plurality of needles, to obtain a prepreg of three-dimensional structure; and
    carbonizing and calcining said prepreg to obtain a carbonaceous matrix;
    wherein said filler containing liquid comprises a synthetic resin liquid and at least one filler selected from the group consisting of graphite powder, carbon black powder, carbon short fiber, graphite short fiber, synthetic resin powder, pitch powder, mesophase pitch powder, coke powder, ceramic powder, metal powder, metal short fiber, $Si_3N_4$ whiskers, SiC whiskers, and ceramic short fibers.

9. A carbon fiber-reinforced carbon composite material as claimed in claim 8, wherein the carbonaceous matrix material is composed of vitreous carbon and soft carbon.

10. A carbon fiber-reinforced carbon composite material as claimed in claim 8, wherein the amount of the filler is 0.5 to 300 times that of the reinforcing material.

* * * * *